CONVERTER CIRCUITS EMPLOYING NEGATIVE RESISTANCE ELEMENTS

Filed Sept. 24, 1959 3 Sheets-Sheet 1

INVENTOR.
KAM LI
BY
John V. Regan
ATTORNEY

INVENTOR.
KAM LI
BY
John V. Regan
ATTORNEY

CONVERTER CIRCUITS EMPLOYING NEGATIVE RESISTANCE ELEMENTS

Filed Sept. 24, 1959 3 Sheets-Sheet 3

INVENTOR.
KAM LI
BY John V. Regan
ATTORNEY 3,062,970
Patented Nov. 6, 1962

3,062,970

CONVERTER CIRCUITS EMPLOYING NEGATIVE RESISTANCE ELEMENTS

Kam Li, Levittown, Pa., assignor to Radio Corporation of America, a corporation of Delaware Filed Sept. 24, 1959, Ser. No. 841,971
9 Claims. (Cl. 307—88.5)

The present invention relates to new and improved circuits employing "negative resistance" diodes. While not restricted thereto, the invention is especially useful for converting electrical information in one form into electrical information in another form, for example, a voltage amplitude into spaced pulses.

The circuit of the present invention includes a diode which exhibits a decrease in current in response to an increase in voltage (a "negative resistance") in one region of its operating range. The diode is placed in said one region of its operating range for a time which depends upon a given parameter of an electrical signal. The output is another type of electrical signal and it has a parameter representative of the magnitude of the given parameter of the input signal. For example, the given parameter of the input signal may be amplitude, frequency, phase or time duration, and the output may be spaced pulses.

The invention will be described in greater detail by reference to the following description taken in connection with the accompanying drawing in which.

Figures 1, 2, 3:
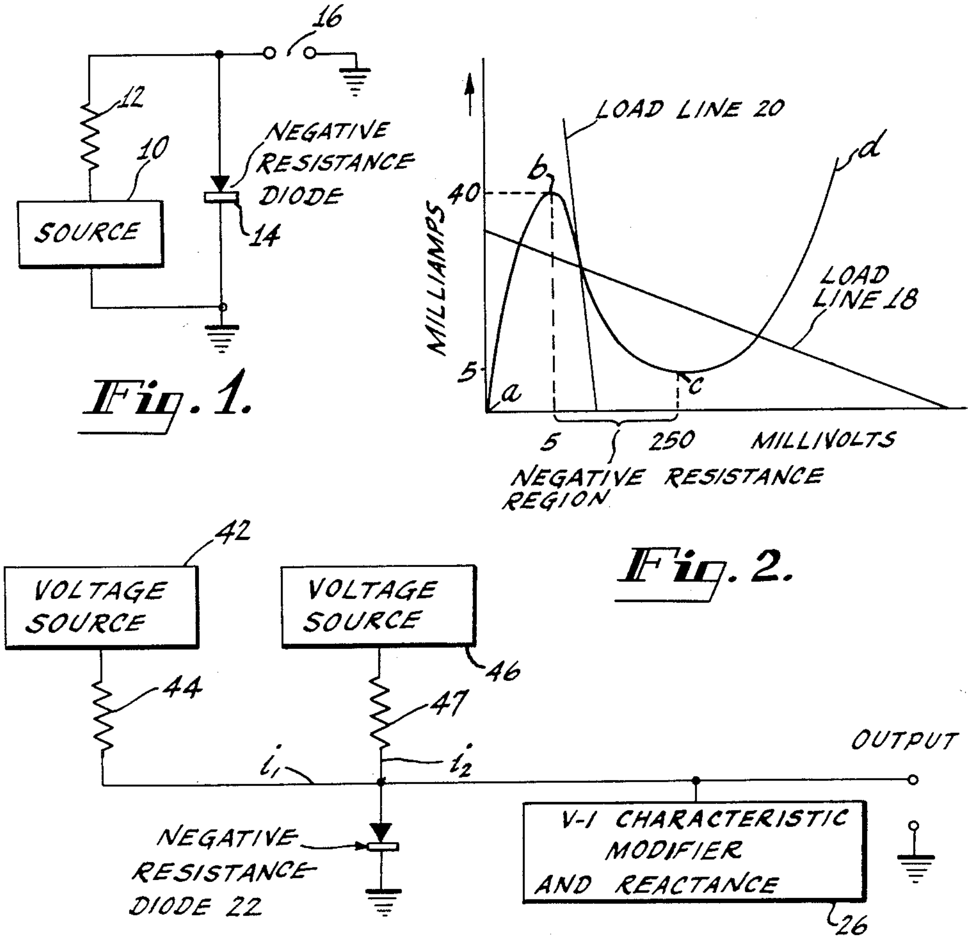
FIG. 1 is a block and schematic circuit diagram of a negative resistance diode circuit which is useful in explaining the invention.
FIG. 2 is a volt-ampere characteristic of the diode of FIG. 1.
FIG. 3 is a block and schematic circuit diagram of a general form of the present invention.

A simple circuit employing a negative resistance diode is shown in FIG. 1. It includes a source 10, a resistor 12 in series with the source, and a negative resistance diode 14. Resistor 12 may be a lumped resistor or it may be the internal resistance of source 10. Source 10 may be either a time-varying or a direct-current source depending upon the use to which the circuit is put. In the discussion which follows, the source will be assumed to be a direct-current source. The output of the circuit is taken at terminals 16.

The characteristic shown in FIG. 2 is the voltage-current characteristic for diode 14 of FIG. 1. The portions *ab* and *cd* of the curve have a positive resistance. In other words, the incremental change in voltage divided by the incremental change in current is a positive quantity. The portion *bc* of the curve has a negative resistance.

Resistor 12 may be of relatively large value, say 10 times or more the diode resistance. The resistance of the diode is low, a few ohms or so. In this case, the load line for the circuit may be as indicated at 18. Its slope and points of intersection with the diode characteristic, depend, of course, on the source voltage and the value of resistor 12. The load line passes through the positive resistance regions *ab* and *cd* of the characteristic and also through the negative region *bc* of the characteristic.

As is understood in the art, with a load line like 18, the diode of FIG. 1 is capable of assuming one of two stable states. One state corresponds to the intersection of the load line 18 with positive resistance region *ab* and the other corresponds to the intersection of the load line with positive resistance region *cd*. The two positive resistance regions are in two different voltage ranges, therefore, one stable state is termed a "low voltage" state and the other a "high voltage" state. Elements exhibiting the type of characteristic shown in FIG. 2 are known generally in this art as "voltage controlled" negative resistance elements. Negative resistance region *bc* is unstable and the diode will not remain at a voltage within this region if the load line is like 18. Instead it will quickly switch to one or the other stable voltage state.

When the value of resistor 12 is reduced, the slope $$\frac{dI}{dE}$$

where I is current and E is voltage, of the load line increases. When the resistance of the source and resistor 12 is sufficiently small, the two together approximate a constant voltage source and the load line can be made to pass only through a positive resistance region of the characteristic or only through the negative resistance region *bc* of the characteristic as shown at 20. With a load line 20 approaching a constant voltage line and passing only through the negative resistance region, the diode is capable of oscillating and will do so if appropriate reactance is present in the diode circuit. In a practical circuit of this type, source 10 should be of low internal impedance, of the order of a few ohms or less, and of low voltage of the order of 100 millivolts. Resistor 12, in this case, may represent this internal impedance.

A circuit according to the present invention is shown in FIG. 3. The negative resistance diode 22 has a characteristic such as shown in FIG. 2 or such as shown in greater detail in curve 24 of FIG. 5. The scale values are not meant to be limiting and it is to be understood, for example, that the current scale can be widely different for different diodes. The negative resistance region of the curve 24 is shown by a dashed line as, in the method employed to view the characteristic on an oscilloscope, it either did not appear as a trace or appeared as a distorted trace due to the limitations of the measuring equipment. However, the negative resistance region of one particular diode employed extended from about 50 millivolts to about 250 or 280 millivolts. If the circuit using the one diode has an 80 ohm load line 48, it can be seen that no matter how the load line is varied, it can never pass through the negative resistance region of curve 24 without at the same time passing through a positive resistance region of the curve. Thus, with an 80 ohm load line, it would not be possible to drive the diode into oscillation.

Figure 5:
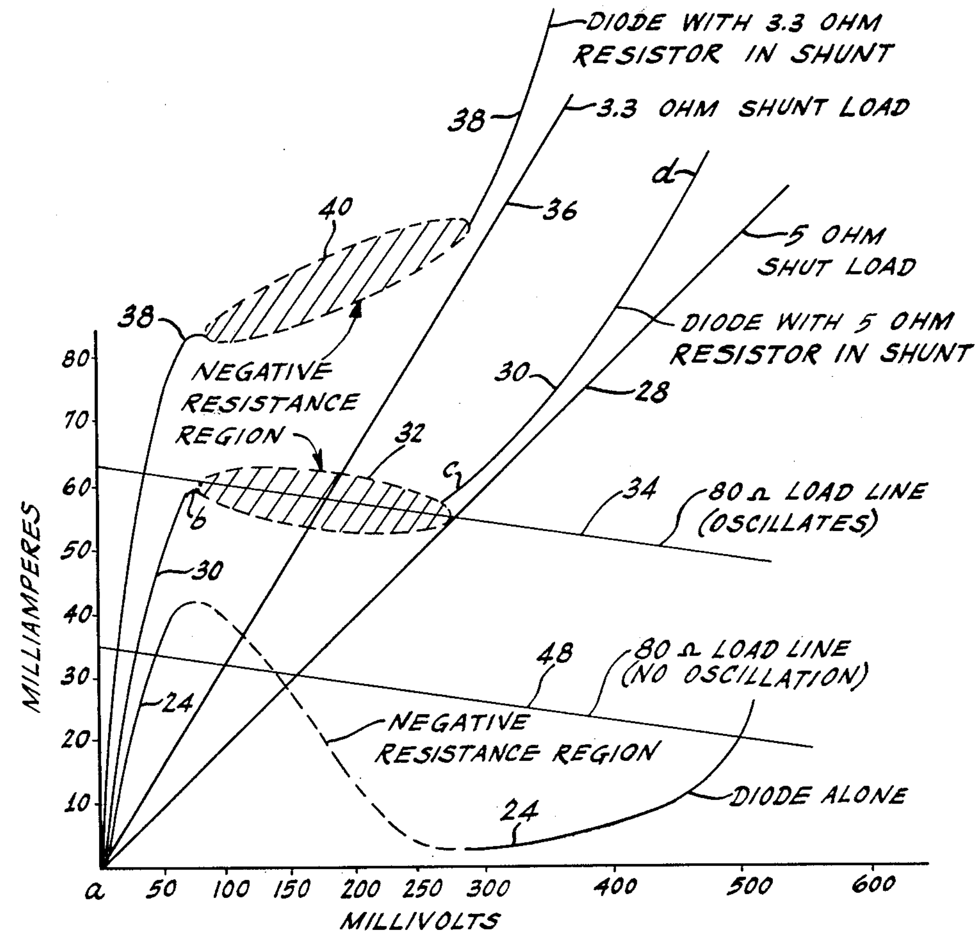
FIG. 5 is a drawing of the volt-ampere characteristics of the circuit of FIG. 4.

One way to get the diode 22 to oscillate with the 80 ohm load line is to modify the diode characteristic 24, and to place a reactance in circuit with the diode. Block 26 shown in FIG. 3 connected in shunt with the diode serves these functions. The block 26 may take a number of forms. Assume for a moment that the block 26 includes a resistor in shunt with the diode 22. The diode itself may have a forward resistance of the order of 2 to 3 ohms or so. Assume that the shunt resistor has a value of 5 ohms. Its load line is shown at 28 in FIG. 5. The resulting voltage-current characteristic for the positive resistance portion of the diode plus the resistor in shunt is shown at 30. The negative resistance region of the curve is not observable on the oscilloscope but it is known to be present as the circuit does oscillate when appropriate voltages are applied. This will be explained in greater detail later. Since the precise shape of the negative resistance portion of the load line under alternating current operating conditions is not known accurately, it is shown in FIG. 5 as a cross-hatched area 32. It must be emphasized that this representation is not meant to indicate that the negative resistance region actually looks this way but merely that its precise shape is not fully known. It can now be seen that if the 80 ohm line is shifted to the position shown at 34, it does intersect the negative resistance region and, with appropriate reactances present in circuit with the diode, the diode will oscillate.

Curves 36 and 38 illustrate the change in the diode characteristic with a 3.3 ohm resistor in shunt with the diode. The explanation of these curves is similar to that given above. It must also be mentioned here that even though the portion 40 of the curve appears in the figure to have a positive slope rather than a negative one, it is, in fact, a negative resistance region. This is certain because tests have indicated that when the load line passes through the region, the diode oscillates.

Returning to FIG. 3, the diode 22, in combination with the block 26, exhibits a modified volt-ampere characteristic such as shown at 30 or 38, the precise shape of the characteristic depending in general upon the value of shunt resistance employed. A plurality of signal sources are used to shift the load line in desired fashion, each different source supplying a different increment of operating current. A source 42 applies a current $i_1$ through resistor 44 to diode 22. A second source 46 applies a current $i_2$ through resistor 47 to the diode. The sources 42 and 46 may be time-varying sources, such as alternating voltage sources; one may be a direct voltage source and the other an alternating voltage source; or a third voltage source (not shown) of direct current may be used with a pair 42, 46 of alternating voltage sources. The particular combination employed will depend in each case on the function to be performed by the circuit. Moreover, the alternating voltage may be of any number of types such as sine wave, sawtooth, square wave, or any other suitable time-varying voltage, etc. Note that when a direct voltage source is used, the resistor associated with each alternating voltage source is of sufficiently high value to effectively isolate the alternating and direct source from each other.

The circuit of FIG. 3. operates as follows. The currents $i_1$ and $i_2$ applied to the diode 22 shift the load line. Assume that the voltage-current characteristic is as shown at 30 in FIG. 5. Assume also that the load line for the circuit of FIG. 3 has a value of 80 ohms. For low values of current $i_1+i_2$, the loan line may be at the position indicated by line 48 in FIG. 5. This load line intersects the positive resistance region *ab* of the characteristic 30 and accordingly no oscillations are produced. However, as the sum of $i_1+i_2$ increases, the load line is shifted upward as viewed in FIG. 5 towards the negative resistance region of the diode. When the load line is shifted to the position indicated by line 34 in FIG. 5, it does intersect the negative resistance region *bc* and the circuit oscillates. The number of oscillations produced by the circuit will depend upon the time during which the load line 34 remains in the negative resistance region. This dependence of oscillations on the time the load line remains in the negative resistance region makes the circuit very valuable as a means for converting one form of information into another. For example, if one of the currents $i_1$ is a sawtooth current and the other $i_2$ a direct current, the direct current may be varied until only the upper portion of the sawtooth causes the load line 34 to intersect the negative resistance region 32. Each time the sawtooth causes the load line to intersect the negative resistance region, oscillations are produced. If the direct current $i_2$ is increased so that the sawtooth current $i_1$ drives the load line into the negative resistance region for a greater interval of time, more cycles of oscillations are produced during each cycle of the sawtooth current. It has been found that the number of oscillations produced per cycle of input alternating current $i_1$ is an accurate measure of the value of the direct current $i_2$.

Figure 4:
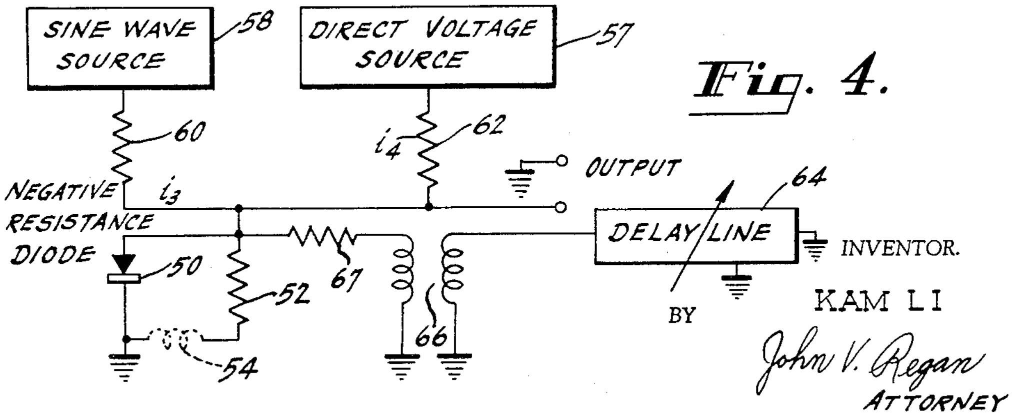
FIG. 4 is a block and schematic circuit diagram of a more specific form of the invention.

A circuit according to the invention is shown in greater detail in FIG. 4. Diode 50 is shunted by a small value of resistance 52. The leads on the resistance introduce a certain amount of distributed inductance as is indicated by the dashed inductor 54. The current $i_3$ applied to the diode 50 is a sine wave current derived from source 58. The current $i_4$ applied to the diode is a direct current derived from source 57. Resistors 60 and 62 in series with sources 58 and 57, respectively, may be of relatively large value, of the order of 50 to several hundred ohms.

When diode 50 is driven into its negative resistance region, oscillations are produced. Frequency stability is appreciably improved by the delay line 64 which is transformer coupled to the diode at 66. A small coupling resistor 67 is located between the transformer and diode. Its purpose is to limit the direct current flowing through the primary winding. In operation, a pulse output from the diode oscillation circuit passes down the delay line and is reflected back from the receiving end of the delay line. The delay line is shown to have a short-circuited receiving end; however, the delay line could be terminated in an open circuit instead. The reflected pulses lock the frequency of the diode circuit to a value dependent on the round trip delay time. The frequency may be changed by changing the delay line length.

Figure 6:
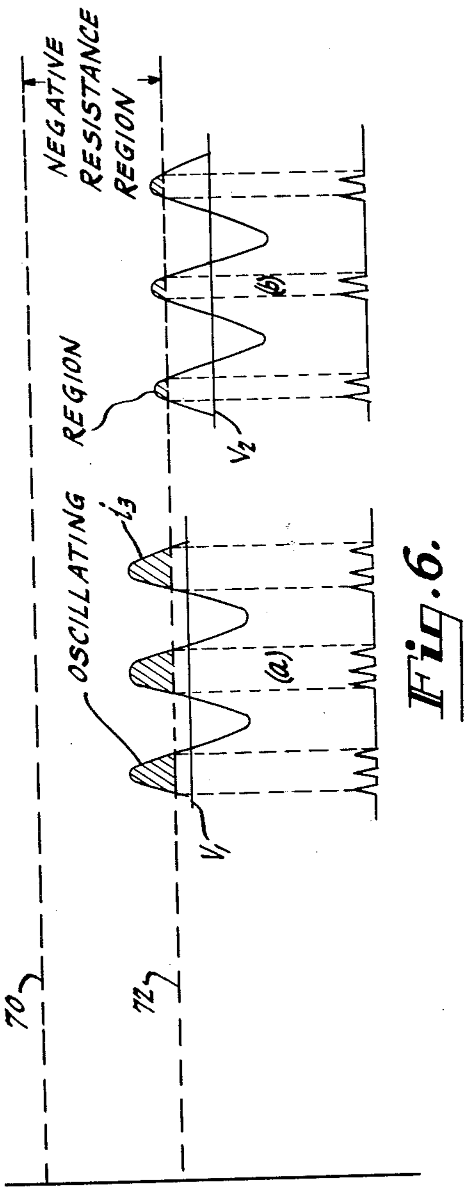
FIGS. 6 and 7 are drawings of waveforms to explain the operation of circuits of FIGS. 3 and 4.
Figure 7:
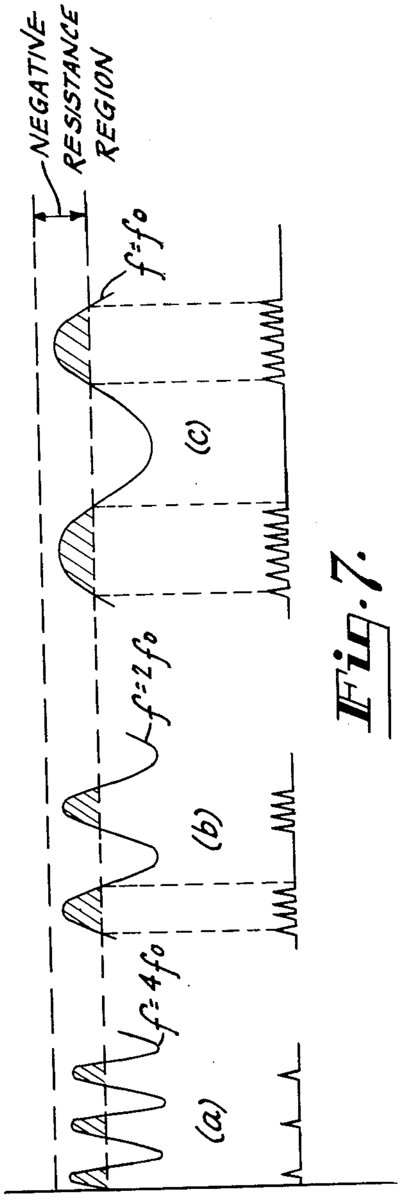

The modes of operation of the circuit of FIG. 4 may more readily be understood by referring respectively to FIGS. 6 and 7. In the operation contemplated in FIG. 6, the frequency and amplitude of the output produced by sine wave source 58 is constant and the amplitude of the current $i_4$ derived from source 57 varies. In FIG. 6*a*, the direct current $i_4$ produces a voltage $V_1$ across the diode. The voltage $V_1$ is assumed to be close to the negative resistance region of the diode. This region lies between lines 70 and 72 in FIG. 6 which correspond to voltages of about 50 and 270 millivolts respectively. It may be assumed that the peak-to-peak amplitude of the sine wave current $i_3$ is sufficient to drive the diode into the negative resistance region once each cycle.

When in the negative resistance region, the diode acts as a generator and, with the circuit coupled to it, produces oscillations (pulses in the embodiment illustrated). The oscillating frequency is substantially constant. When the diode is driven out of the negative resistance region, the oscillations stop. The number of cycles of oscillation produced each time the diode is in the negative resistance region depends upon the time it remains there. This, in turn, depends upon the voltage $V_1$. Thus, the number of cycles of oscillation (a digital indication) is a measure of a direct current or voltage (an analog quantity). With the value of voltage of $V_1$ illustrated, three pulses are produced for each cycle of an alternating current $i_3$.

If the direct current $i_4$ is decreased so that the voltage across the diode is $V_2$ as shown in FIG. 6*b*, the diode spends less time in the negative resistance region and the number of pulses produced each cycle of $i_3$ is less. Two pulses are shown for each cycle of $i_3$ in FIG. 6*b*.

In the illustration of FIG. 6, the negative resistance region is shown being approached from the lower positive resistance portion of curve 30 in FIG. 5. It should be appreciated that the circuit also operates well if the negative resistance region is approached from the upper positive resistance portion *cd* of characteristic 30. This requires that the diode normally be forward-biased to a higher value of voltage, say 300 or 400 millivolt, for example. The alternating current now can be properly chosen so that the negative peaks drive the diode into the negative resistance region. Also, the direct current bias can be such that the load line normally passes through the negative resistance region and the alternating voltage drives the diode into its positive resistance region once or twice each cycle.

In the mode of operation illustrated in FIG. 7, the direct current $i_4$ is maintained constant, the amplitude of the sine wave current $i_3$ is maintained constant, and the frequency of the sine wave is changed. The direct current bias places the diode in its positive resistance region. The D.C. bias may be sufficient, for example, to produce a voltage of 40 millivolts or so. The alternating current amplitude is sufficient to drive the diode into its negative resistance region once each cycle. It can readily be seen from FIG. 7 that as the frequency decreases, the number of pulses produced each cycle increases. Thus, the number of pulses each cycle is a measure of the frequency of the sine wave signal from source 58 (FIG. 4).

Figure 8:
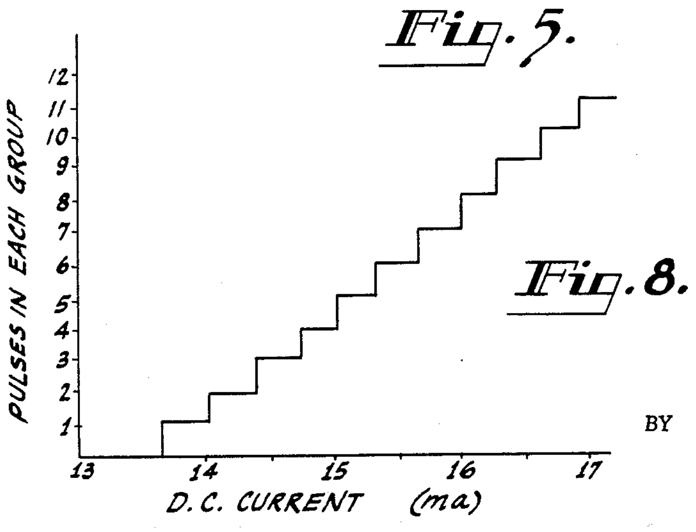
FIG. 8 is a plot of number of pulses of output versus a D.C. input for the circuit of FIG. 4.

FIG. 8 is a graph showing the operation of the circuit of FIG. 4 as an analog to digital converter, more specifically, a direct current to pulse converter. It can be seen that small changes in current are indicated by corresponding changes in the number of pulses in each group of pulses.

The circuit of FIG. 4 has also been operated as a frequency to pulse converter. A specific circuit gave the following results:

| Input frequency: | Pulses generated each cycle of input signal |
|---|---|
| 0.6 megacycle | 2 |
| 0.4 megacycle | 3 |
| 0.2 megacycle | 4 |
| 0.1 megacycle | 8 |

A diode shunted by a resistor without the delay line 64 is capable of producing either a pulse output or an output close to a sine wave. It has been found that when very short leads are used on resistor 52, the output frequency of the circuit, when it oscillates, is relatively high and the waveform is close to a sine wave. As the leads on resistor 52 are increased in length, the frequency of the circuit decreases and the waveform approaches a pulse type waveform. Finally, when the resistor 52 leads are formed into one or more turns, the frequency decreases still further and the waveform becomes a pulse waveform. It is believed that when the leads on the resistor are very short, the distributed inductive reactance of the leads may be close in value to the distributed capacitive reactance of the diode. Under these conditions, it is believed that the circuit looks mainly like an LC circuit and therefore the output oscillations are close to sine wave oscillations. It is also believed that as lead inductance increases, the circuit looks more like an LR circuit than an LC circuit, so that the circuit produces pulses rather than a sine wave.

Practical circuits have been made using a shunt resistor 52 with very short leads which have produced output frequencies up to about 130 megacycles. Increasing the lead length decreased the output frequency to 10 megacycles and less. It was found that the frequency of oscillations could be reduced even into the hundred kilocycle region.

With the circuit shown in FIG. 4, it was found possible to change the output frequency by changing the effective length of delay line 64. Delay lines actually employed had delay values ranging from zero to about 1 microsecond or so.

In the circuits described above, sine wave source 58 may produce a peak-to-peak alternating voltage of about 2 to 5 volts, or so, and the D.C. voltage may be in the same range. Resistors 60 and 62 may be of the order of 100 to 200 ohms, for the particular diode used. Thus, for a given diode, the voltage and resistances are chosen so that the resulting load line can intersect the negative resistance region without intersecting the positive resistance regions. Resistor 52 may have a value of from 3 to 10 ohms or so, but, here too, values up to 20 to 30 ohms are possible.

In FIG. 5, the load line employed is 80 ohms. Other values are possible. Oscillations have been observed with a curve like 30 with load lines which varied from about 50 to 150 ohms.

In the embodiments of the invention illustrated, pulse and D.C. sources approximating constant current sources are employed. These are easier to work with in view of the impedance and considerations discussed previously. However, the invention is also operative using constant voltage sources of appropriate value. Here, the load line normally intersects only one positive region of the diode characteristic and a time-varying voltage drives the load line into the negative resistance region of the diode characteristic.

What is claimed is:

1. A circuit for converting a parameter of a signal to a count comprising, in combination, a circuit including a voltage controlled negative resistance diode having a voltage-current characteristic one portion of which exhibits negative resistance and other portions of which exhibit positive resistance, said circuit having a load line which normally intersects at least a portion of positive resistance of said characteristic; resistor means in shunt with the diode for altering said voltage-current characteristic an extent sufficient to permit said load line to pass through said portion of said characteristic of negative resistance without passing through the portions of said characteristic of positive resistance; a reactance in circuit with said diode and forming therewith an oscillatory circuit when said load line passes through said portion of said characteristic of negative resistance; and means responsive to said signal for placing said load line in said region of negative resistance for a time which is proportional to the value of said parameter to obtain a number of oscillations proportional to said value.

2. A circuit for converting an analog quantity to a count indicative of the value of said quantity comprising, in combination, a voltage controlled negative resistance element having two positive resistance operating regions, one in one voltage range and the other in another voltage range, and a negative resistance operating region between said two positive resistance operating regions, and quiescently operating in one of said positive resistance operating regions; means for applying a first current to said element; means for applying a second current to said element, at least one of said currents being a time varying current, and the sum of said currents being sufficient periodically to place said diode in its negative resistance operating region, one of the frequency of one of the currents and the amplitude of the other current representing said analog quantity; and means including a reactance in circuit with said diode for producing regularly spaced pulses solely during each interval said element is in its negative resistance operating region, whereby the number of said pulses produced each said interval is indicative of the value of said quantity.

3. In the combination as set forth in claim 2, one of said currents being a direct current and the other a sinusoidal current, whereby changes in the frequency of said sinusoidal current produce changes in the number of pulses produced by said oscillatory circuit during each cycle of said sinusoidal current.

4. A circuit for converting a parameter of a signal to a count indicative of the magnitude of said parameter comprising, in combination, an element which exhibits a negative resistance in one portion of its operating range and a positive resistance in another portion of its operating range and which quiescently operates in the positive resistance portion of its operating range; means responsive to a parameter of an applied signal for placing said element in the negative resistance portion of its operating range for a duration of time which depends upon the magnitude of said parameter; and means coupled to said element for producing regularly spaced pulses solely during the time it is in said negative resistance portion of its operating range, whereby the number of said pulses depend upon the magnitude of said parameter.

5. A circuit for converting the frequency of a fixed amplitude alternating current signal to a count indicative of said frequency comprising, in combination, a negative resistance diode which has two positive resistance operating regions in different voltage ranges and a negative resistance operating region between the two positive resistance operating regions, and which quiescently operates in one of said positive resistance operating regions; means responsive to the frequency of a fixed amplitude, variable frequency applied signal for applying a current to the diode which periodically changes the diode's operating point to said negative resistance operating region; and means for producing fixed frequency oscillations solely during each period the diode is driven into its negative resistance operating region, whereby the number of said oscillations produced during each said period is a count indicative of the frequency of said applied signal.

6. In combination, a circuit including an element having a voltage current characteristic including a portion exhibiting a negative resistance and a portion exhibiting a positive resistance, and which quiescently operates in its positive resistance region; means in said circuit responsive to an applied signal for causing the element to operate in its region of negative resistance for a time which is proportional to a parameter of said applied signal; and means including a mis-matched delay line connected to said element for producing regularly spaced pulses solely during the interval said element is operating in its region of negative resistance.

7. A circuit for converting a variable analog electrical signal into spaced pulses comprising, in combination, a negative resistance element which is quiescently biased to operate in a positive resistance operating region; means for applying said variable analog signal to said element in a sense to drive the same into its negative resistance operating region; and a circuit coupled to the diode for producing regularly spaced pulses solely during each interval the diode is driven into its negative resistance operating region.

8. In combination, a tunnel diode; a circuit coupled to the tunnel diode providing a load line for the tunnel diode which normally intersects solely a positive resistance operating region of the voltage versus current characteristic of the tunnel diode and which can be driven, in response to an applied signal, to intersect solely the negative resistance operating region of the voltage versus current characteristic of the tunnel diode; means for concurrently applying a direct and an alternating signal to the tunnel diode at levels such that the operating point of the tunnel diode is driven between positive and negative resistance operating regions of the tunnel diode; and a circuit coupled to the tunnel diode for producing a plurality of regularly spaced pulses solely during each interval the tunnel diode is in its negative resistance operating region.

9. A circuit for converting an analog quantity to a count indicative of the value of said analog quantity comprising, a negative resistance element quiescently operating in a positive resistance operating region; means for driving the element into its negative resistance operating region for a time proportional to the value of said analog quantity; and means for producing fixed frequency pulses solely during each interval said element is in its negative resistance region, whereby, the number of said pulses produced during each said interval is a count indicative of the value of said analog quantity.

References Cited in the file of this patent

UNITED STATES PATENTS

| | | |
|---|---|---|
| 2,469,569 | Ohl | May 10, 1949 |
| 2,740,940 | Becker et al. | Apr. 3, 1956 |
| 2,772,352 | Tellier | Nov. 27, 1956 |
| 2,772,360 | Shockley | Nov. 27, 1956 |
| 2,899,646 | Read | Aug. 11, 1959 |
| 2,986,724 | Jaeger | May 30, 1961 |

FOREIGN PATENTS

| | | |
|---|---|---|
| 158,879 | Australia | Sept. 16, 1954 |
| 491,603 | Great Britain | Sept. 6, 1938 |

OTHER REFERENCES

Shockley, "The Four-Layer Diode," Electronics Industries & Tele-Tech, August 1957, pages 58 and 59.